(12) United States Patent
Archbold et al.

(10) Patent No.: US 10,772,440 B2
(45) Date of Patent: Sep. 15, 2020

(54) FOOD WELL DISPLAY

(71) Applicant: Structural Concepts Corporation, Muskegon, MI (US)

(72) Inventors: James Neil Archbold, Grant, MI (US); Lee Isaac Simon, Superior, CO (US)

(73) Assignee: Structural Concepts Corporation, Muskegon, MI (US)

( * ) Notice: Subject to any disclaimer, the term of this patent is extended or adjusted under 35 U.S.C. 154(b) by 148 days.

(21) Appl. No.: 15/990,977

(22) Filed: May 29, 2018

(65) Prior Publication Data

US 2018/0352974 A1     Dec. 13, 2018

Related U.S. Application Data

(60) Provisional application No. 62/516,187, filed on Jun. 7, 2017.

(51) Int. Cl.
| | |
|---|---|
| *A47F 3/06* | (2006.01) |
| *A47J 39/00* | (2006.01) |
| *A47F 3/04* | (2006.01) |
| *F25D 23/06* | (2006.01) |
| *F25D 25/02* | (2006.01) |
| *A47B 57/40* | (2006.01) |

(52) U.S. Cl.
CPC .............. *A47F 3/06* (2013.01); *A47F 3/0439* (2013.01); *A47F 3/0469* (2013.01); *A47J 39/006* (2013.01); *F25D 23/067* (2013.01); *F25D 25/02* (2013.01); *A47B 57/406* (2013.01); *A47F 2003/046* (2013.01); *A47F 2003/0473* (2013.01); *F25D 2400/10* (2013.01)

(58) Field of Classification Search
CPC .. A47F 3/06; A47F 3/0439; A47F 2003/0473; A47F 2003/046; A47J 39/006; A47B 57/406; F25D 23/067; F25D 25/02; F25D 2400/10
See application file for complete search history.

(56) References Cited

U.S. PATENT DOCUMENTS

| | | | |
|---|---|---|---|
| 1,876,172 A * | 9/1932 | Ruddy | A47B 57/04 108/6 |
| 2,257,580 A * | 9/1941 | Trompeter | F24C 15/02 219/418 |
| 2,929,227 A * | 3/1960 | Rainwater | A47F 3/0443 62/256 |

(Continued)

FOREIGN PATENT DOCUMENTS

| | | | | |
|---|---|---|---|---|
| FR | 3008601 A1 * | 1/2015 | | A47F 3/0456 |

*Primary Examiner* — Daniel J Troy
*Assistant Examiner* — Ryan A Doyle
(74) *Attorney, Agent, or Firm* — Warner Norcross + Judd LLP

(57) ABSTRACT

A flexible merchandising food well display configured for use with a cabinet including a countertop. The food well display includes an upwardly open food well housed within the cabinet and the countertop defines an opening into the food well. The flexible merchandising food well display further includes a height-adjustable shelving system within the food well. The shelving system includes a plurality of shelves, each of which may be individually mounted within the food well at a selectable height such that the shelves may support different containers at different heights within the food well.

18 Claims, 12 Drawing Sheets

(56) References Cited

U.S. PATENT DOCUMENTS

| | | | | |
|---|---|---|---|---|
| 3,009,333 | A * | 11/1961 | Rainwater | A47F 3/0443 62/256 |
| 5,022,720 | A * | 6/1991 | Fevig | A47F 3/005 108/107 |
| 6,612,124 | B1 * | 9/2003 | Hatch | A47F 10/06 220/661 |
| 10,426,292 | B2 * | 10/2019 | Roever | A47J 36/34 |
| 2006/0016774 | A1 * | 1/2006 | Bustos | A47B 45/00 211/186 |
| 2006/0201177 | A1 * | 9/2006 | Spillner | A47F 3/0447 62/258 |
| 2012/0248957 | A1 * | 10/2012 | Eaves, Jr. | A47B 77/16 312/350 |
| 2016/0081493 | A1 * | 3/2016 | Wood | A47F 3/04 108/50.18 |
| 2016/0135615 | A1 * | 5/2016 | Goch | A47F 3/0447 62/62 |
| 2018/0160854 | A1 * | 6/2018 | Jennings | A47J 36/2483 |

* cited by examiner

FOOD WELL DISPLAY

BACKGROUND OF THE INVENTION

The present invention relates to food well displays, and more particularly to food well display counters with modular shelves that are adjustable without tools.

Food display cases and counters are well known and widely used for the retail and food service display of food. The display case or counter, which can include a food well, typically is refrigerated. Instead or in addition, the display counter may be heated.

The food counters typically include a recessed food well positioned in a cabinet and a countertop with a central opening into the well. Stainless steel pans, commonly referred to as "hotel pans" may be "dropped into" the food well and extend into the temperature-controlled area of the food well. Accordingly, the hotel pans and their contents are cooled or heated from the refrigerated or heated food well. Unfortunately, because the hotel pans are positioned below the countertop, it is often difficult for a consumer to view the food within the pan until the consumer is standing next to the food counter looking down into the pans. This is especially the case when relatively small amounts of food remain in the pan. Further, the particular types of display or food vessels or containers related to these traditional food wells are limited and restrict an operator's options to enhance presentation, merchandising, and ultimately sales. Another common means of displaying food utilizes "frost tops" that are flush with the countertop, or slightly raised. These units, however, do not permit compliance with food safety regulations.

Operators of food serving establishments attempt to display non-packaged food, such as bulk deli food, in a manner that attracts the consumer's attention and stimulates the impulse to buy. It has been found that food that is easily viewed and accessed sells faster and has more repeat demand than otherwise. The presentation of food in a buffet or counter service setting has therefore become of increasing importance. Further, it is beneficial to be able to regularly and easily reconfigure the food well display in order to vary the presentation methods and display height of the food, based on changes in the food offerings over time, as well as the amount or volume of food presented.

SUMMARY OF THE INVENTION

The noted problems are addressed by the present invention. A flexible merchandising food well display includes an easily configurable, customizable, modular shelf system within the food well. The shelf system may be easily and rapidly configured to provide enhanced presentation of food, for example, in view of the particular foods and the amount of food to be presented with increased flexibility to use a wider variety of display vessels.

In one embodiment, a flexible merchandising food well display is configured for use with a cabinet including a countertop. The food well display includes an upwardly open food well housed within the cabinet and the countertop defines an opening into the food well. The food well display further includes a modular shelf system within the food well. A shelf module includes vertically adjustable support brackets and shelves supported on the brackets. The shelf modules may be mounted individually within the food well, each at its own desired height.

In another embodiment, the support brackets and shelves are configured to be mounted at an angle such that the shelves and display positions are angled relative to the countertop.

The food well display includes integrated, modular shelves that can be deployed or removed as desired, allowing operators to vary the amount of the food well that is utilized for displaying refrigerated, heated, and/or ambient food offerings.

Food well displays in accordance with the present invention provide enhanced presentation and visibility of foods. The shelf modules provide flexibility to display different food items at different heights in different containers.

These and other features and advantages of the invention will be more fully understood and appreciated by reference to the entire application including the specification, the claims, and the drawings.

DESCRIPTION OF THE CURRENT EMBODIMENTS

Figure 1:
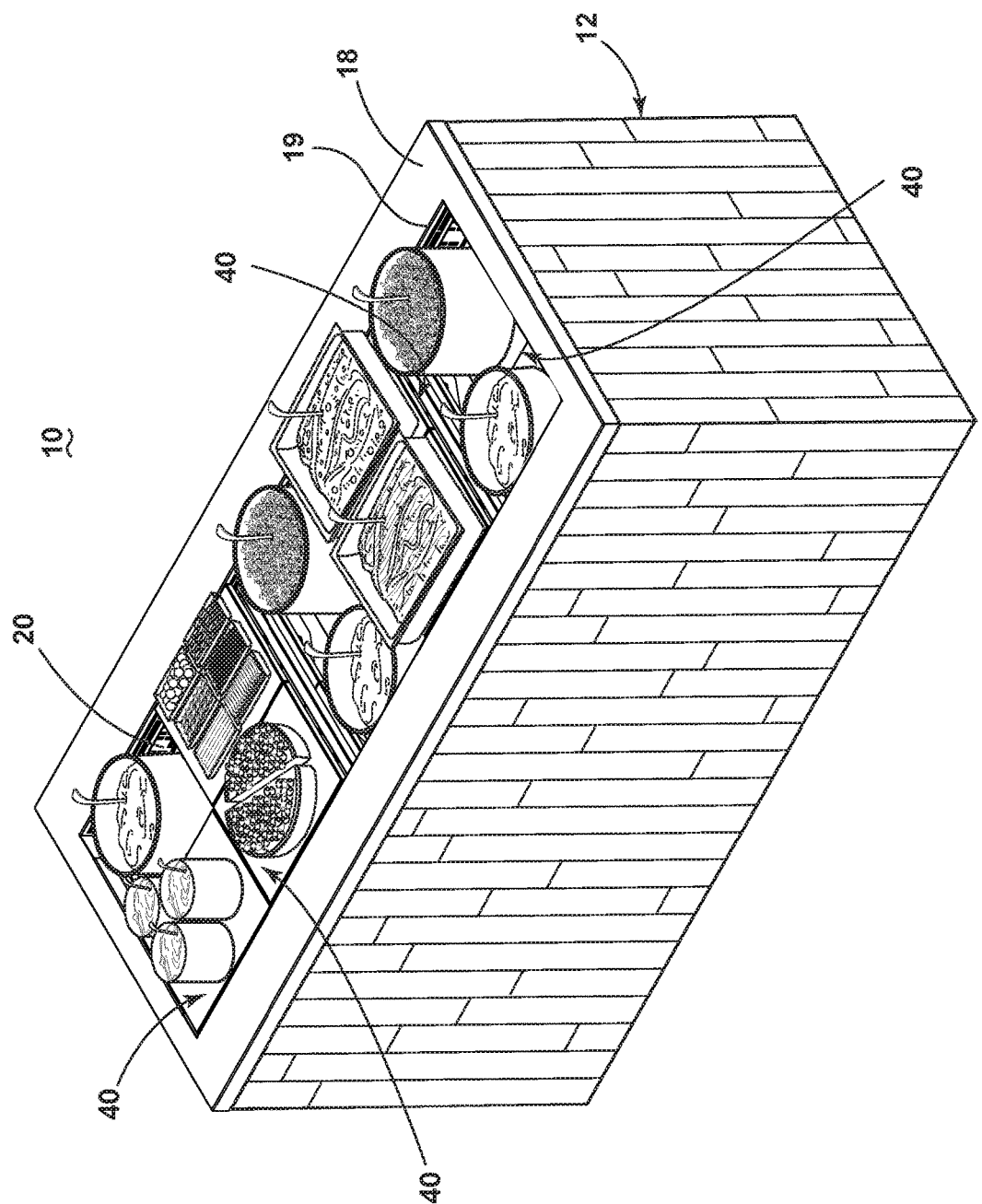
FIG. 1 is a perspective view of a food well display according to a first embodiment of the invention, shown installed within a cabinet and countertop and illustrating an exemplary presentation of a variety of containers and food.

A food well display in accordance with one embodiment is illustrated in FIGS. 1-6. The food well display 10 is particularly adapted for use in supermarkets, coffee shops, restaurants, buffets, and other retail stores to display merchandise, particularly food and food related accompaniments. The food well display may be a non-refrigerated display counter for use as a produce stand, merchandising rack, and for retailing packaged food. Optionally, the food well display may be temperature controlled and used as a refrigerated service or self-serve counter as often used for non-packaged food available, for example, in the deli department of a supermarket and other food serving venues. Further optionally, the food well display may be heated to keep the displayed food warm.

Operators of food serving establishments attempt to display non-packaged food, such as bulk deli food, in a manner that attracts the consumer's attention and stimulates the impulse to buy. It has been found that food that is easily viewed and accessed sells faster and has more repeat demand than otherwise. The presentation of food in a buffet or counter service setting has therefore become of increasing importance. Traditionally, non-packaged food is placed in stainless steel hotel pans, and most often these hotel pans are recessed into the cabinet for reasons related to temperature control, etc. However, recessed pans inhibit the visibility of the food to the consumer while also limiting presentation options. Further, it is beneficial to be able to reconfigure the display counter in order to vary the presentation methods and display height of the food, based on changes in the food offerings over time, as well as the amount or volume of food presented and the vessels or containers used for presentation.

Throughout this description, directional terms, such as "upper", "lower", "inner", "outer", "front", and "rear", are used to assist in describing the invention based on the orientation of the embodiment shown in the illustrations. More specifically, the below description refers to the food well display 10 in the orientation shown in FIG. 1. The "front" side of the food well display 10 is considered to be the side from which the consumer views the food well display 10. Regardless, the use of directional terms should not be interpreted to limit the invention to any specific orientation(s).

The food well display 10 includes an upper cabinet 14 and a base cabinet 16, and can be housed within a cabinet 12. The base cabinet 16 is of conventional design and may house mechanical equipment that provides cooling and/or heating, such as an evaporator assembly, fan, etc. The upper cabinet 14 defines an opening 19 in a countertop or counter surface 18. A food well 20 is housed within the cabinet 12 and mounted under the countertop 18 in alignment with the countertop opening 19. The food well 20 is upwardly open and includes a bottom surface 22, a front wall 24, a rear wall 26, and opposed end walls 28. The bottom surface 22 may be a drip pan, and the food well 20 may be made of stainless steel so as to resist corrosion and enable easy cleaning. Notably, the food well display 10 could be retrofitted into an existing cabinet and countertop, or the food well display 10 could be provided with a new cabinet and countertop.

Figure 3:
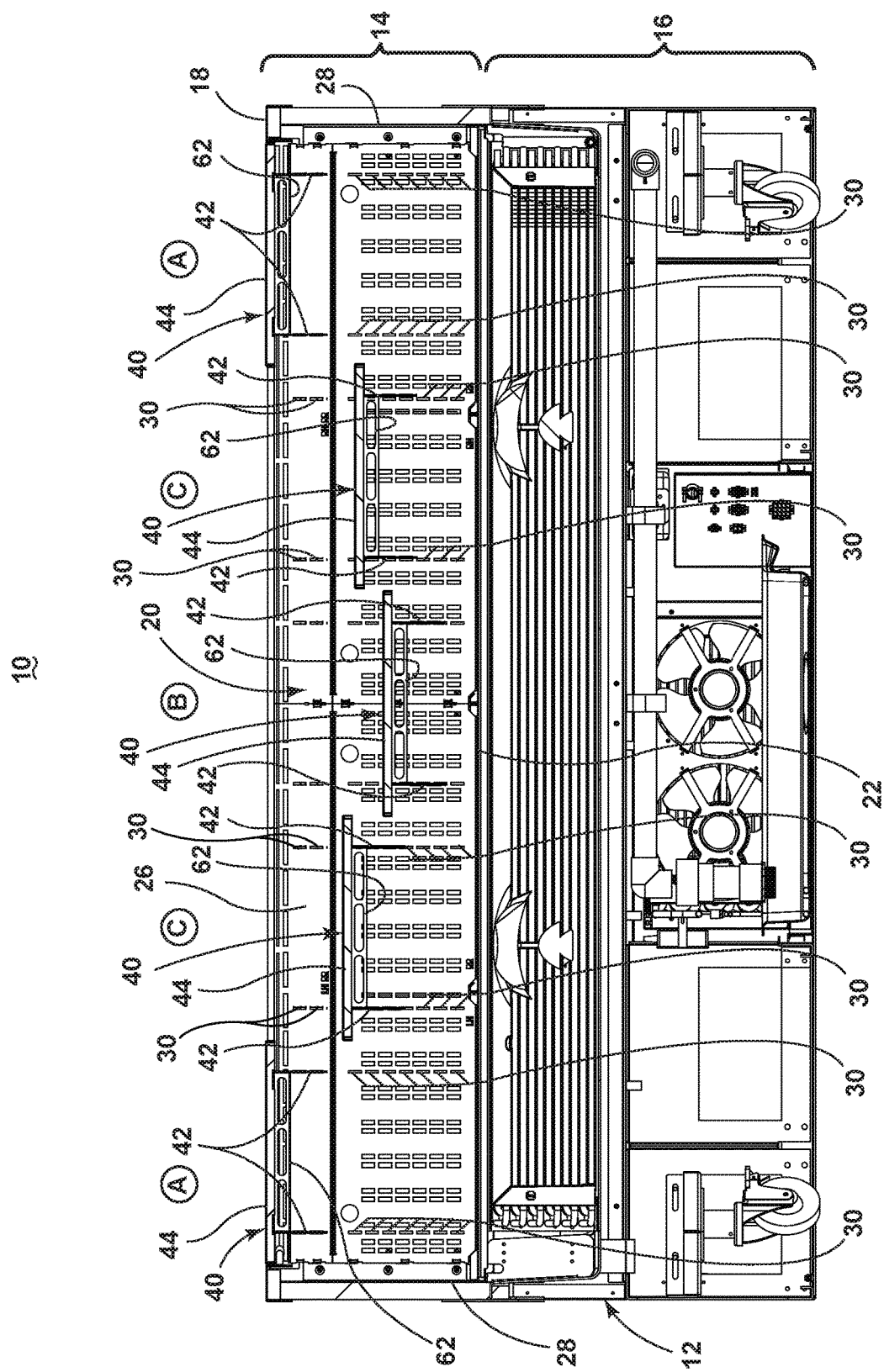
FIG. 3 is a cross-sectional view of the food well display, taken along line III-III of FIG. 2, illustrating shelf modules disposed in a plurality of display positions.
Figure 4:
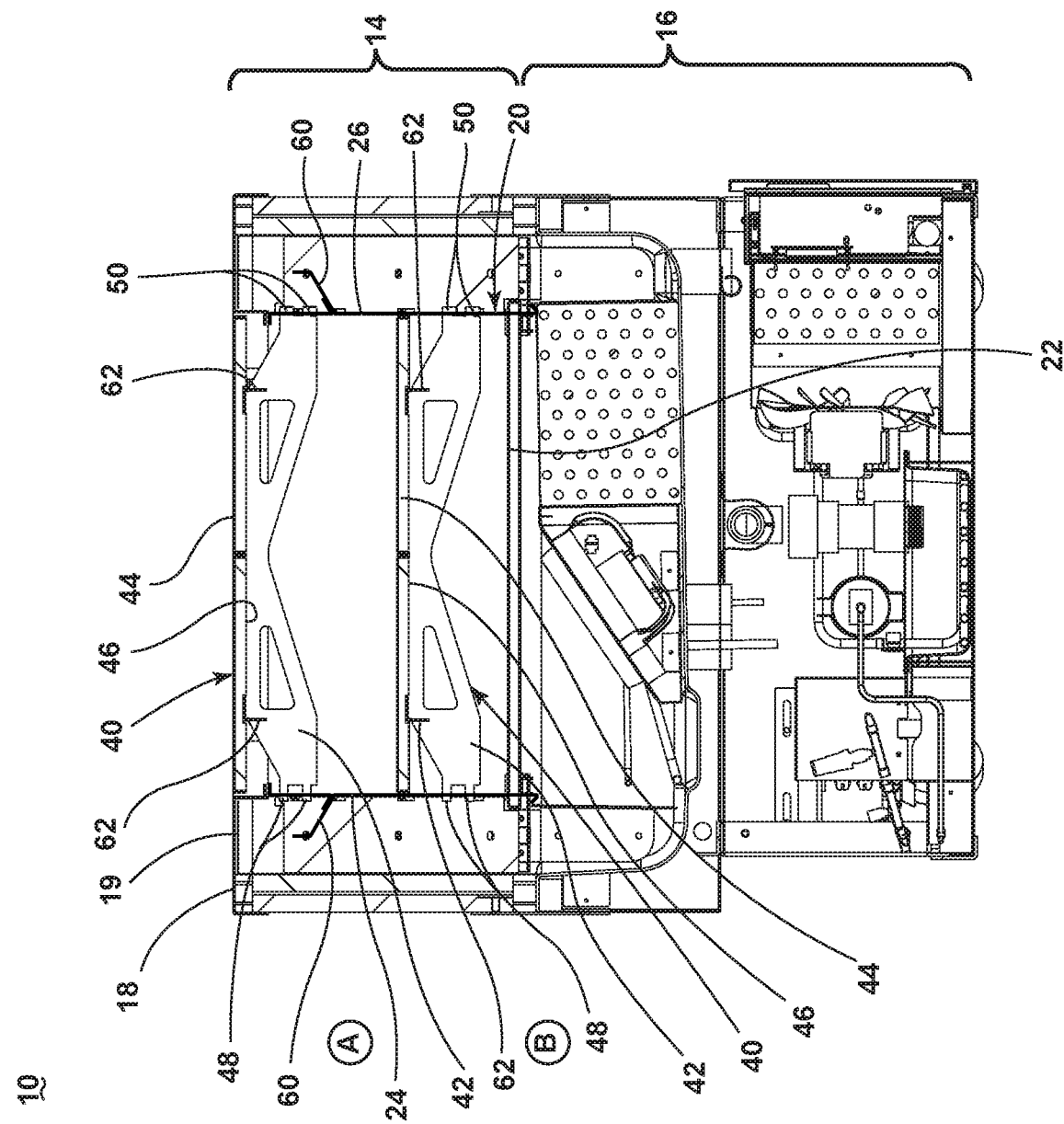
FIG. 4 is a cross-sectional view of the food well display, taken along line IV-IV of FIG. 2, illustrating shelf modules disposed in a plurality of display positions.

Referring to FIGS. 3-4, the front and rear walls 24 and 26 of the food well 20 include aligned columns and rows of slots 30, the purpose of which will be discussed hereinafter. The slots 30 can be arranged with any feasible distance between adjacent slots 30. For example, the slots 30 may be arranged with 1" vertical spacing. Slots 30 in the front and rear walls 24 and 26 are aligned with each other.

Figure 5:
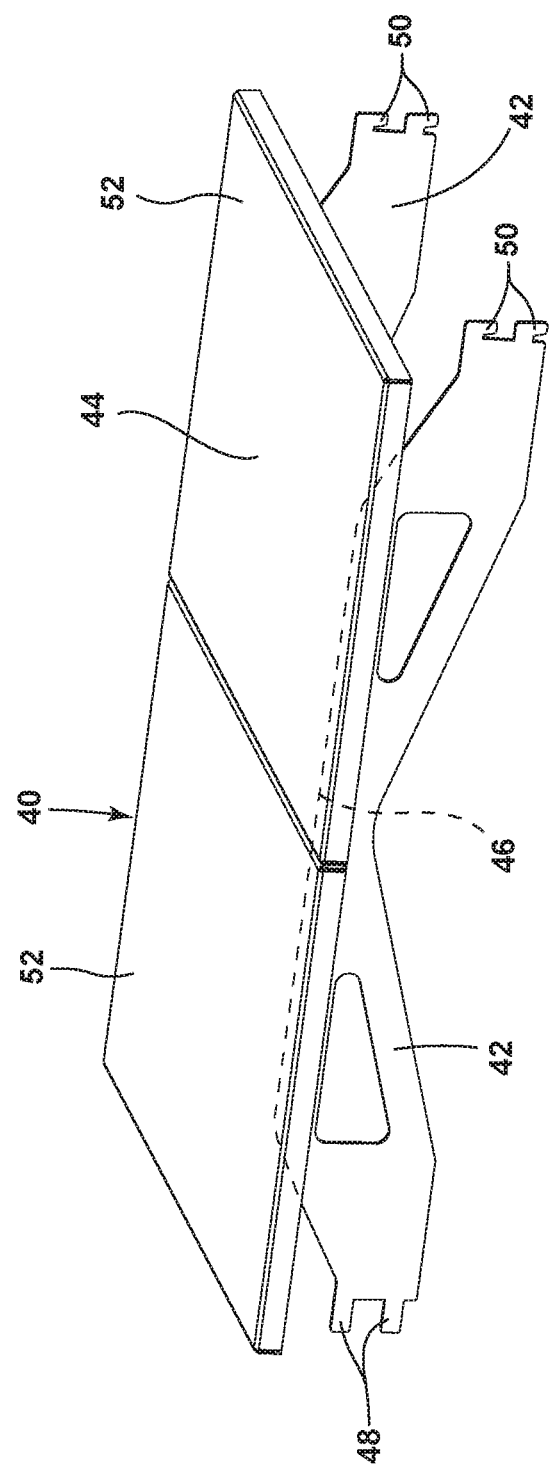
FIG. 5 is a perspective view of a shelf module of the food well display.

Referring now to FIG. 5, the food well display 10 includes one or more shelf modules 40. The shelf module 40 includes two pairs of parallel and spaced support brackets 42 and a shelf 44. Each support bracket 42 is a simple structural member that defines distal ends and a center support surface 46. The support bracket 42 includes a pair of legs 48 at one distal end and a pair of hooks 50 at the other distal end. A lateral support 62 may be included between the support brackets 42 to provide lateral stability. Further, in some instances, the shelf may instead be two half shelves 52.

The support brackets 42 are sized to span the distance between the front and rear walls 24 and 26 of the food well 20. When mounted in the food well 20, the legs 48 are received in slots 30 in one of the front and rear walls 24 and 26, and the hooks 50 are received in slots 30 in the other of the front and rear walls 24 and 26. The shelf 44 is positioned atop a pair of support brackets 42 and is supported by the center support surface 46 of each support bracket 42. In the illustrated example, the shelf module 40 includes two half shelves 52.

Figure 2:
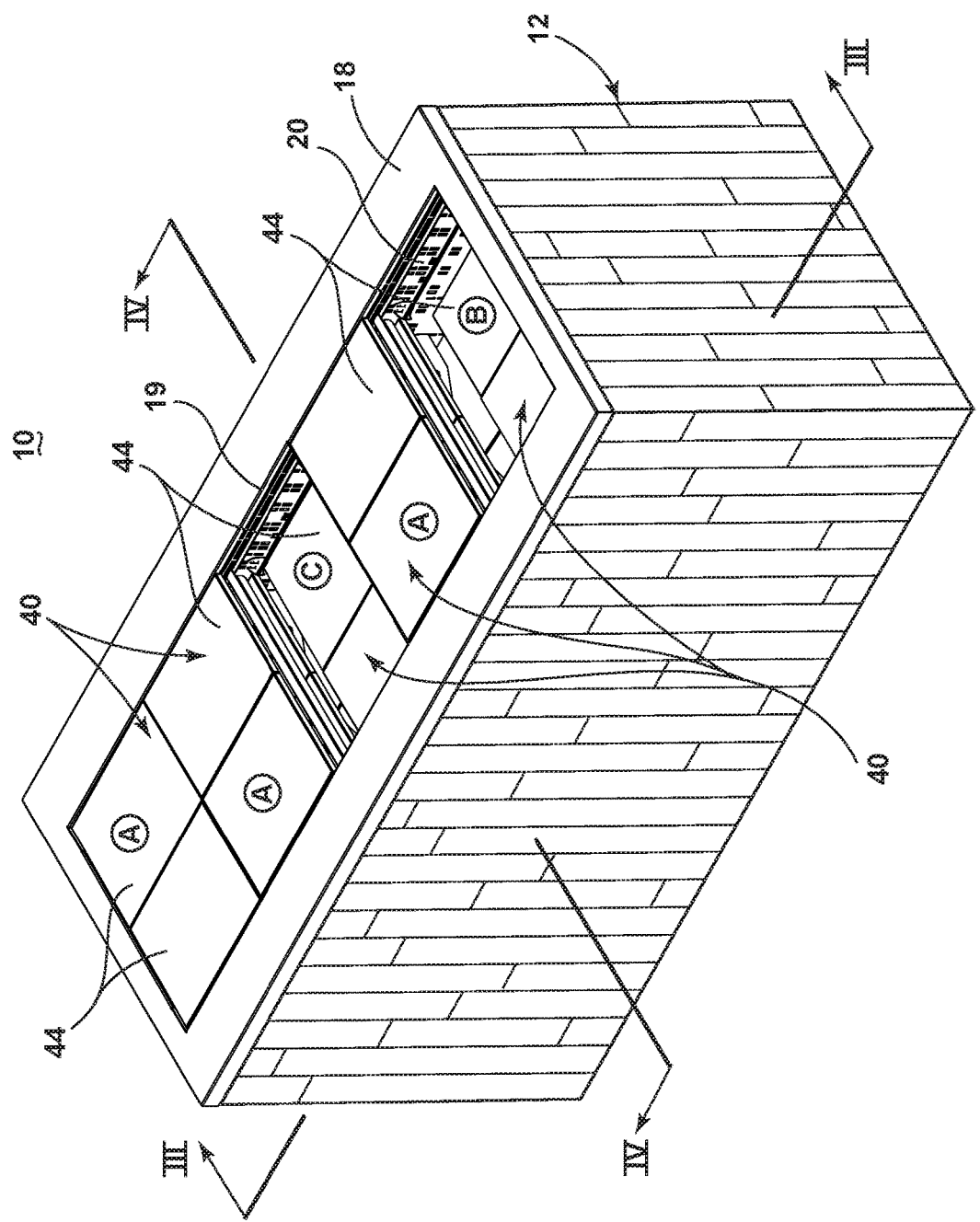
FIG. 2 is a perspective view of the food well display, illustrating shelf modules disposed in a plurality of display positions.

Referring to FIGS. 2-4, the shelf modules 40 are capable of being mounted within the food well 20 at a plurality of selectable heights such that the shelf 44 is selectively disposed in one of a plurality of display positions. For example, a shelf module 40 may be mounted in a first display position A, where the associated shelf 44 or half shelf 52 is positioned substantially flush with the countertop 18. In another example, the shelf module 40 is mounted in a second display position B, where the associated shelf 44 or half shelf 52 is recessed below the countertop 18. A shelf module 40 is shown in a mid-height display position C. It should be readily understood that the shelf module 40 may be selectively positioned within the food well 20 at a variety of heights and display positions, and is only so limited by the spacing between the slots 30 in the front and rear walls 24 and 26 of the food well 20. Further, the shelf modules 40 are independently height adjustable. Alternately, it is contemplated that the height adjustment of the shelf modules can be achieved with a hydraulic lift, electric lift, mechanical lift, or other suitable automated lift means.

Figure 6:
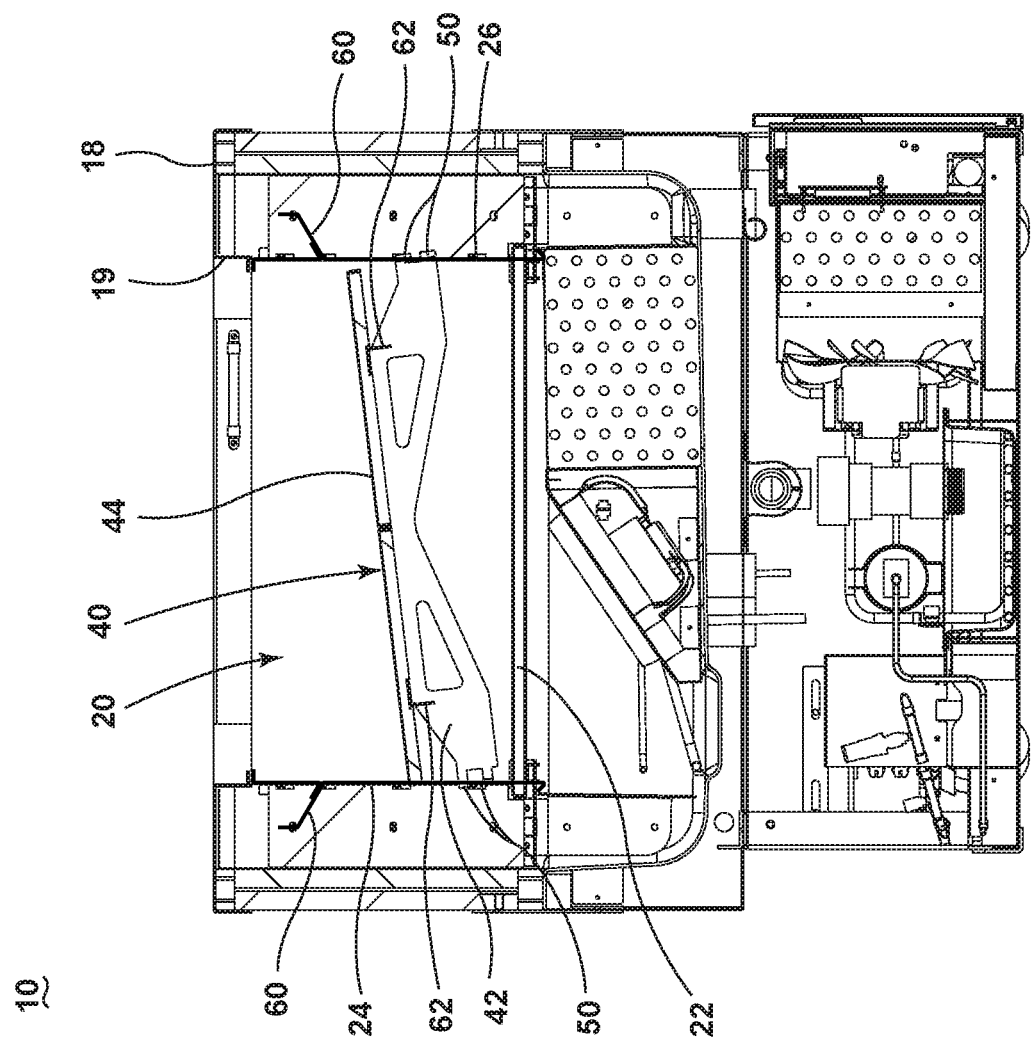
FIG. 6 is a cross-sectional view of the food well display, illustrating shelf modules disposed in a display position angled relative to the countertop.
Figure 7:
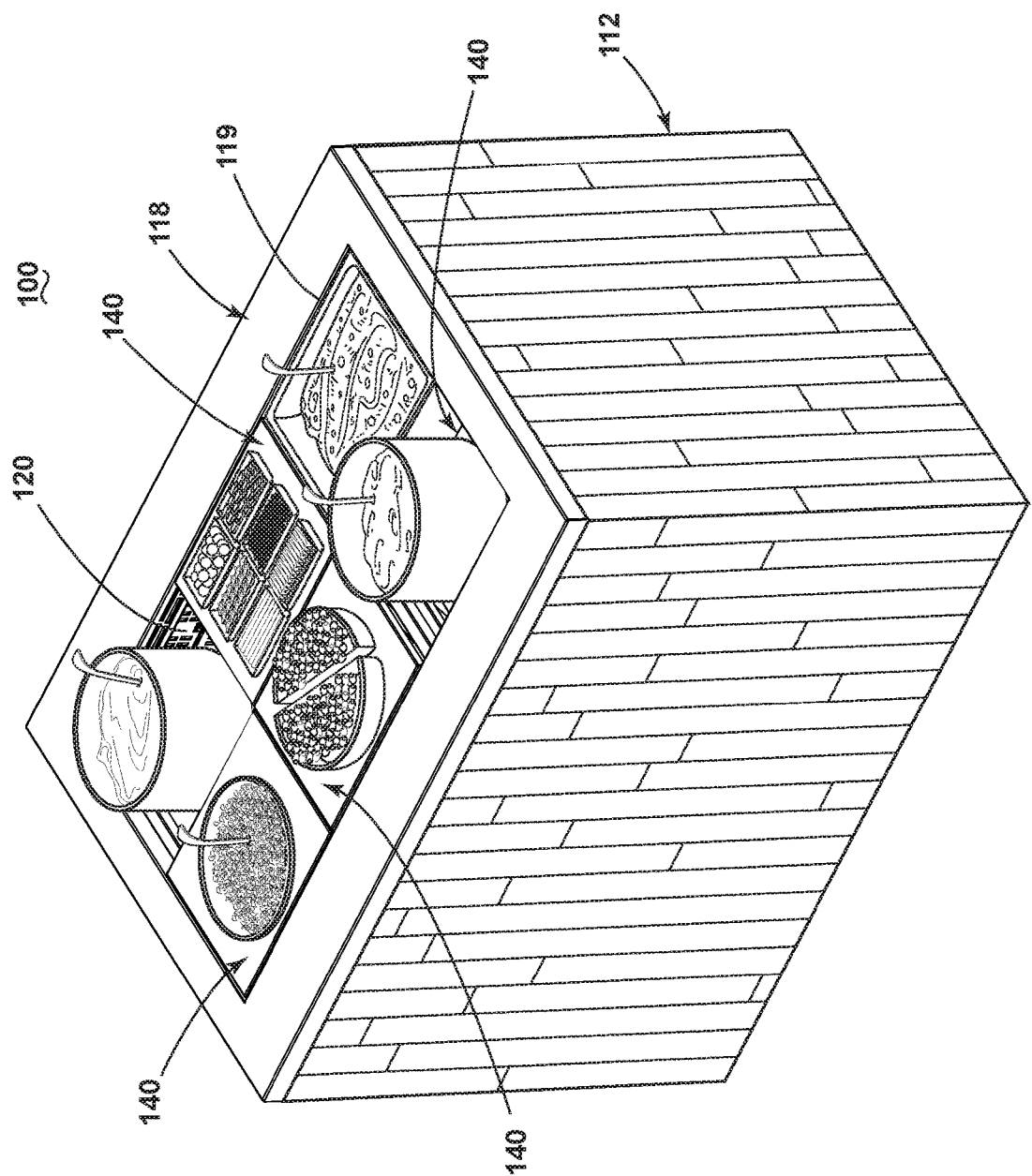
FIG. 7 is a perspective view of a food well display according to a second embodiment of the invention, shown installed within a cabinet and countertop and illustrating an exemplary presentation of a variety of containers and food.
Figure 8:
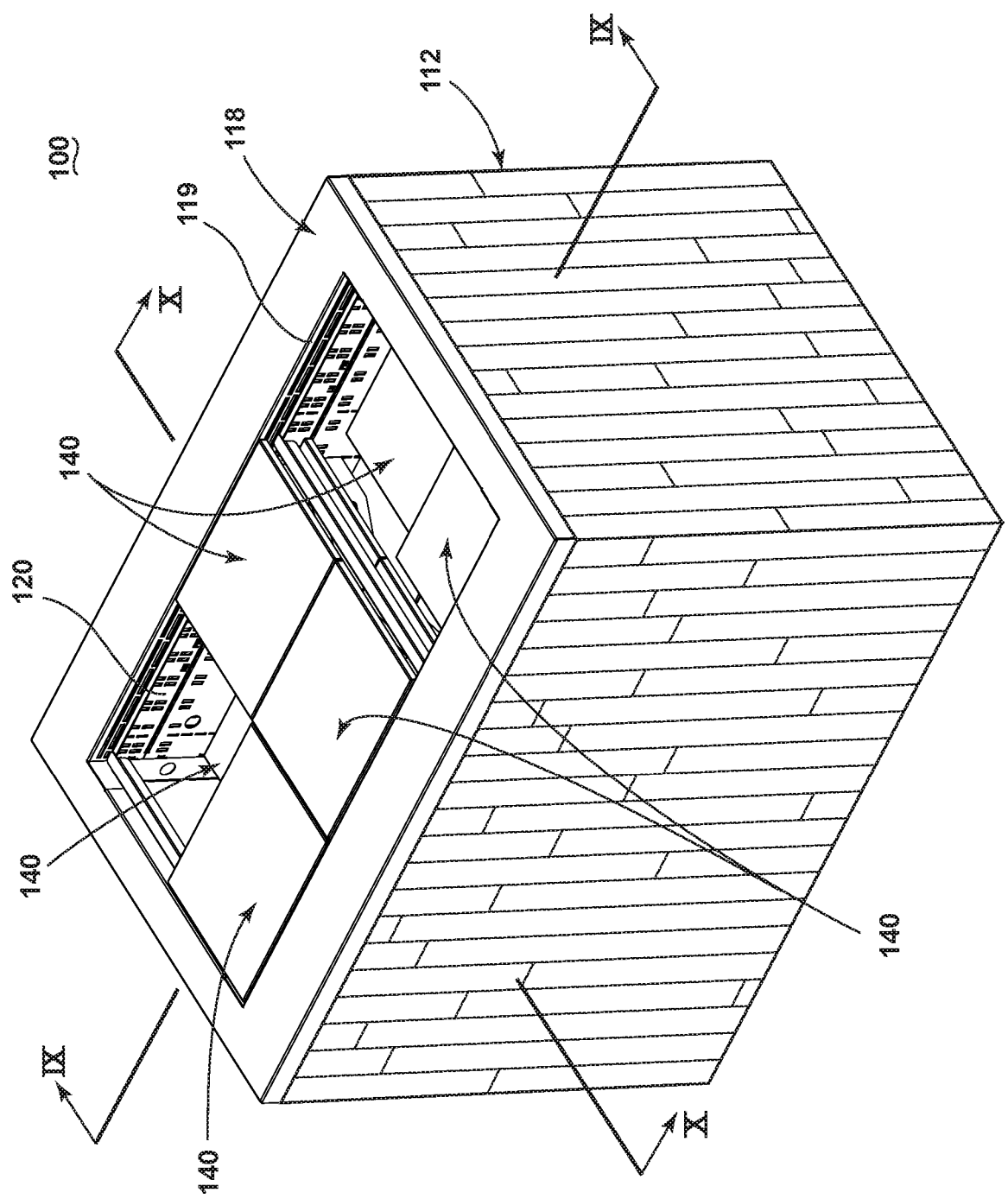
FIG. 8 is a perspective view of the food well display, illustrating shelf modules disposed in a plurality of display positions.
Figure 9:
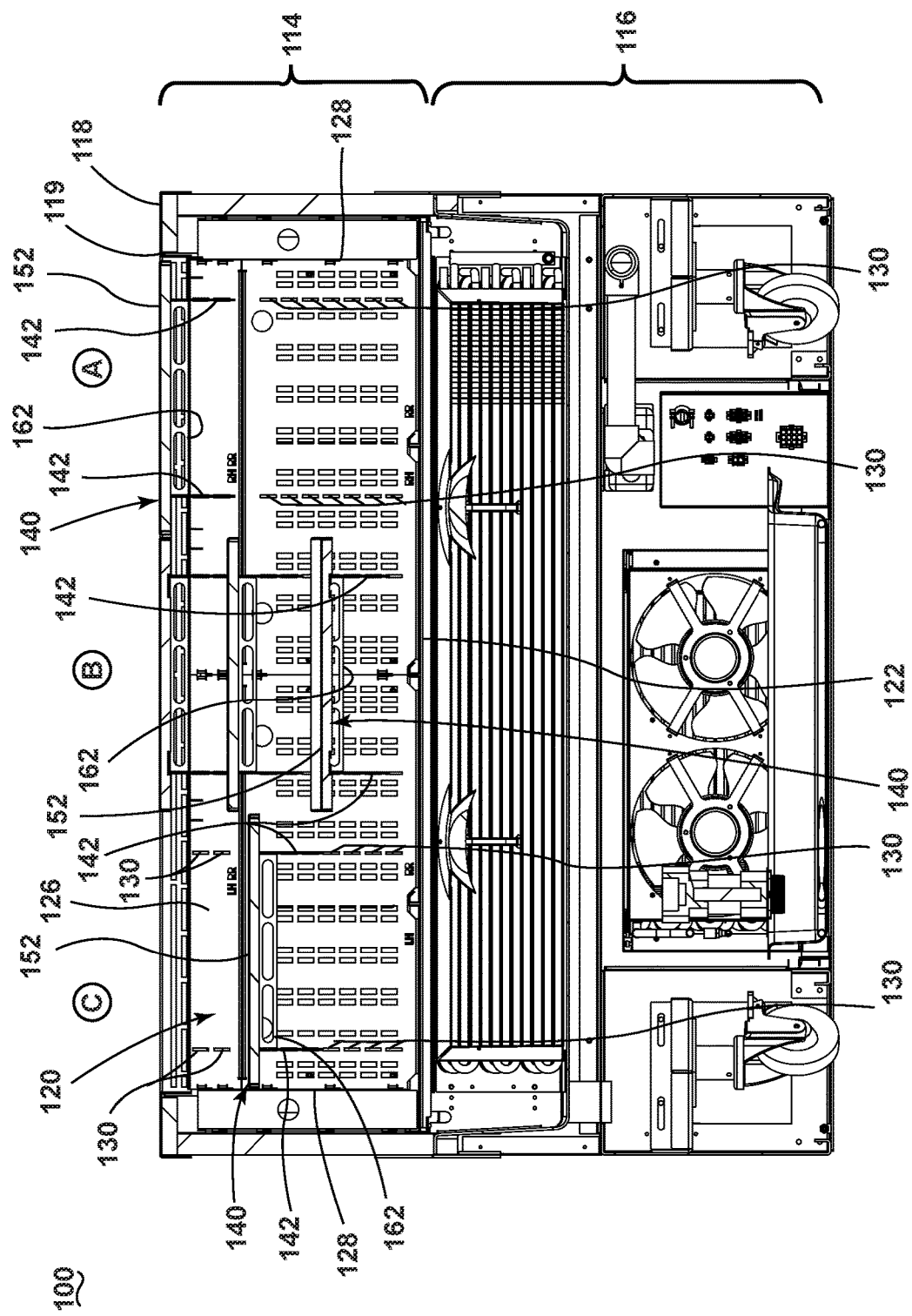
FIG. 9 is a cross-sectional view of the food well display, taken along line IX-IX of FIG. 8, illustrating shelf modules disposed in a plurality of display positions.

Referring to FIG. 6, the shelf modules 40 may also be mounted within the food well 20 at an angle so that the shelf 44 and display position are angled relative to the countertop 18. In this orientation, the legs 48 of the support brackets 42 are inserted into the slots 30 at a height above or below the hooks 50 of the support brackets 42, angling the shelf 44 forward or rearward. An angled display deck improves the visibility of food displayed on the shelves 44.

The present food well display 10 enables food, often unpackaged or bulk food, to be easily displayed to the consumer. Because of the flat surface of the shelves 44 and 52, a variety of sizes and shapes of containers, bowls, plates, hotel pans, dishes, pans, crocks, platters, etc. can be placed upon the shelves 44 and 52 for displaying food. These various containers can be displayed at a selected height that is easily visible and convenient to the guest. In one use example, the shelf 44 is substantially the same perimeter size as a traditional hotel pan to conveniently and easily display a hotel pan thereupon. The shelf module 40 can be positioned at a height such that the display position places the hotel pan substantially flush to the countertop 18. Of course, the pan could be positioned higher or lower than the countertop 18 instead.

According to one embodiment, the shelves 44 and half shelves 52 are made of an insulative material so that if the food well display 10 is refrigerated, the shelves 44 and half shelves 52, which would be cooled from below, would not be covered in condensation. It is further contemplated that the shelves 44, 52 may be heated or cooled directly, for example by infrared heat, induction, hot forced air, and/or by including a heater rod. Thus, a food container placed thereon will help in keeping the food either cool or warm.

The shelves 44 and half shelves 52 can be positioned at the selected height to accommodate refrigerated, heated, and/or ambient food offerings. For example, for refrigerated or heated food, the shelf module 40 can be positioned at a height such that the display position places the food within the food well 20 to keep the food either cool or warm. In this example, the shelf module 40 may be mounted in the second display position B, where the associated shelf 44 or half shelf 52 is recessed below the countertop 18. For food that need only be kept at ambient temperature, the shelf module 40 can be positioned at a height such that the display position places the food at a height substantially even with the countertop 18. In this example, the shelf module 40 may be mounted in the first display position A, where the associated shelf 44 or half shelf 52 is positioned substantially flush with the countertop 18. FIG. 1 illustrates non-limiting examples of a variety of food items with different ambient and cooling or heating requirements, and the various display positions that these exemplary food items can be positioned.

Referring again to FIGS. 3-4, the food well 20 includes a removable bottom surface or drip pan 22. The drip pan 22 is easily removable, without tools, from within the cabinet 12, and is easily cleanable. Additionally, the food well 20 includes spill funnels 60 that extend along the front and rear walls 24 and 26. The spill funnels 60 direct liquid or other spills that fall over the forward and rearward edges of the shelves 44 onto the drip pan 22 below. Spills that fall over the sides of the shelves 44 are also caught by the drip pan 22 below. Further, additional or unused support brackets 42, shelves 44, and half shelves 52 may be stored within the food well 20, below an in-use shelf 44 or half shelf 52.

The food well display 10 is a configurable, modular counter that the customer, grocery store, restaurant, etc. may customize as desired. In particular, the length of the food well 20 and food well display 10 is determined by the number of shelf modules 40 to be included in the counter. Further, the particular material and/or color of the countertop 18 and shelves 44 and 52, as well as the exterior of the cabinet 12, can be selected by the customer.

The food well display 10 provides flexibility and modularity in the positioning of the shelf modules 40. In addition to the number of shelf modules 40 to be included, the display position of each of the shelf modules 40 can be easily raised or lowered to meet the particular product storage and display requirements at any given time. As stated above, the shelf modules 40 are independently height adjustable. This provides a great deal of flexibility for displaying different items in a variety of different containers.

In an embodiment illustrated in FIGS. 7-11, the food well display 100 includes a pair of split or half support brackets 142 and a half shelf 152. The split support brackets 142 have hooks 150, similar to the previous embodiment brackets, and extend less than halfway across the width of the food well 120. A half shelf 152 is positioned atop the pair of split support brackets 142 and is supported by the center support surface 146 of each spilt support bracket 142. Further, a lateral support 162 may be included to provide lateral stability to the pair of split support brackets 142.

Figure 10:
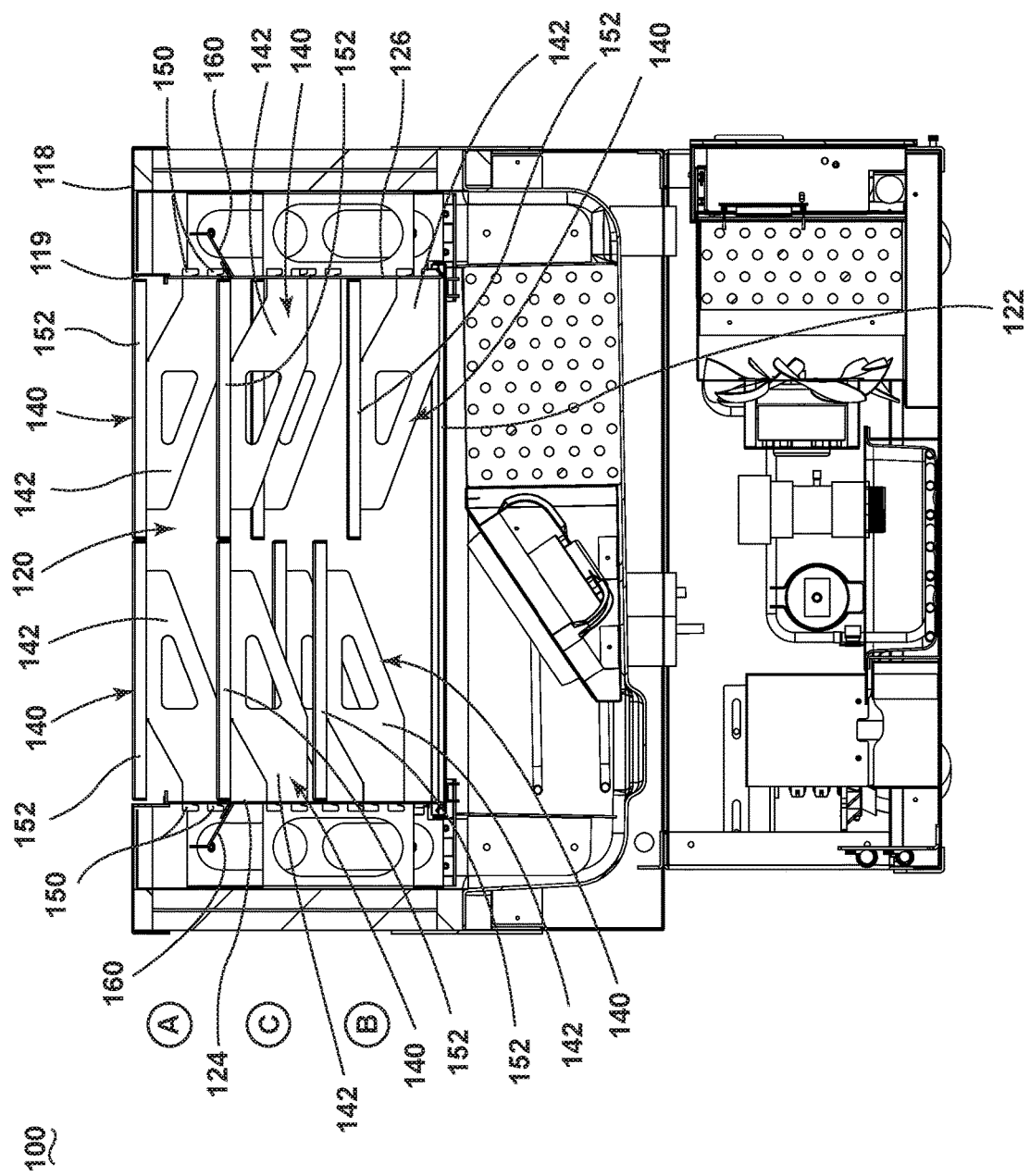
FIG. 10 is a cross-sectional view of the food well display, taken along line X-X of FIG. 8, illustrating shelf modules disposed in a plurality of display positions.
Figure 11:
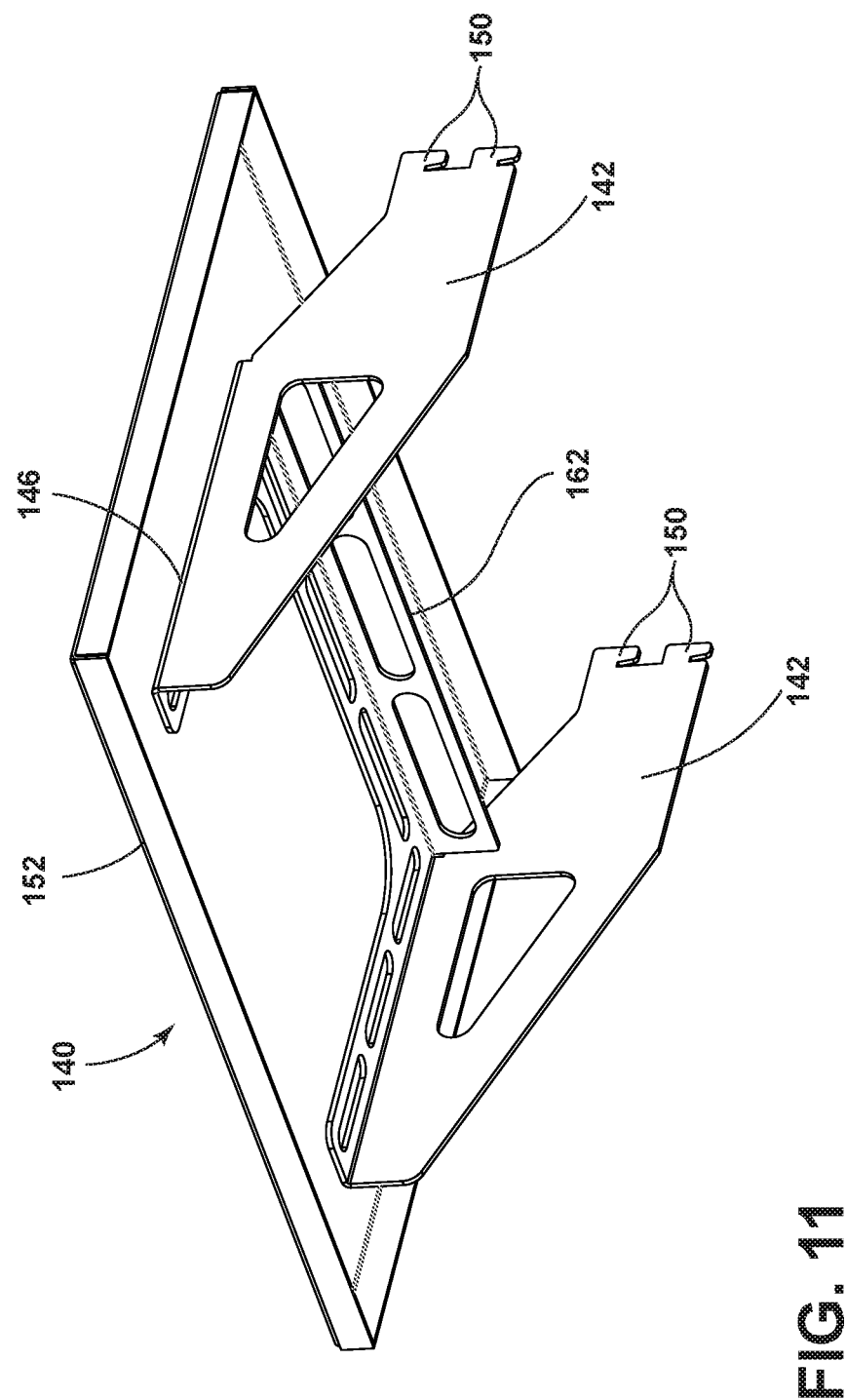
FIG. 11 is a perspective view of a shelf module of the food well display.

Referring to FIG. 11, one pair of split support brackets 142 and one half shelf 152 define a shelf module 140, The food well display 100 includes two or more shelf modules 140; the shelf modules are generally provided in pairs. As shown in FIG. 10, a first shelf module 140 is mounted to the front wall 124 of the food well 120 and a second shelf module 140 is mounted to the rear wall 126 of the food well 120. Aligned first and second shelf modules 140 span the width of the food well 120. The shelf modules 140 are independently height adjustable.

Figure 12:
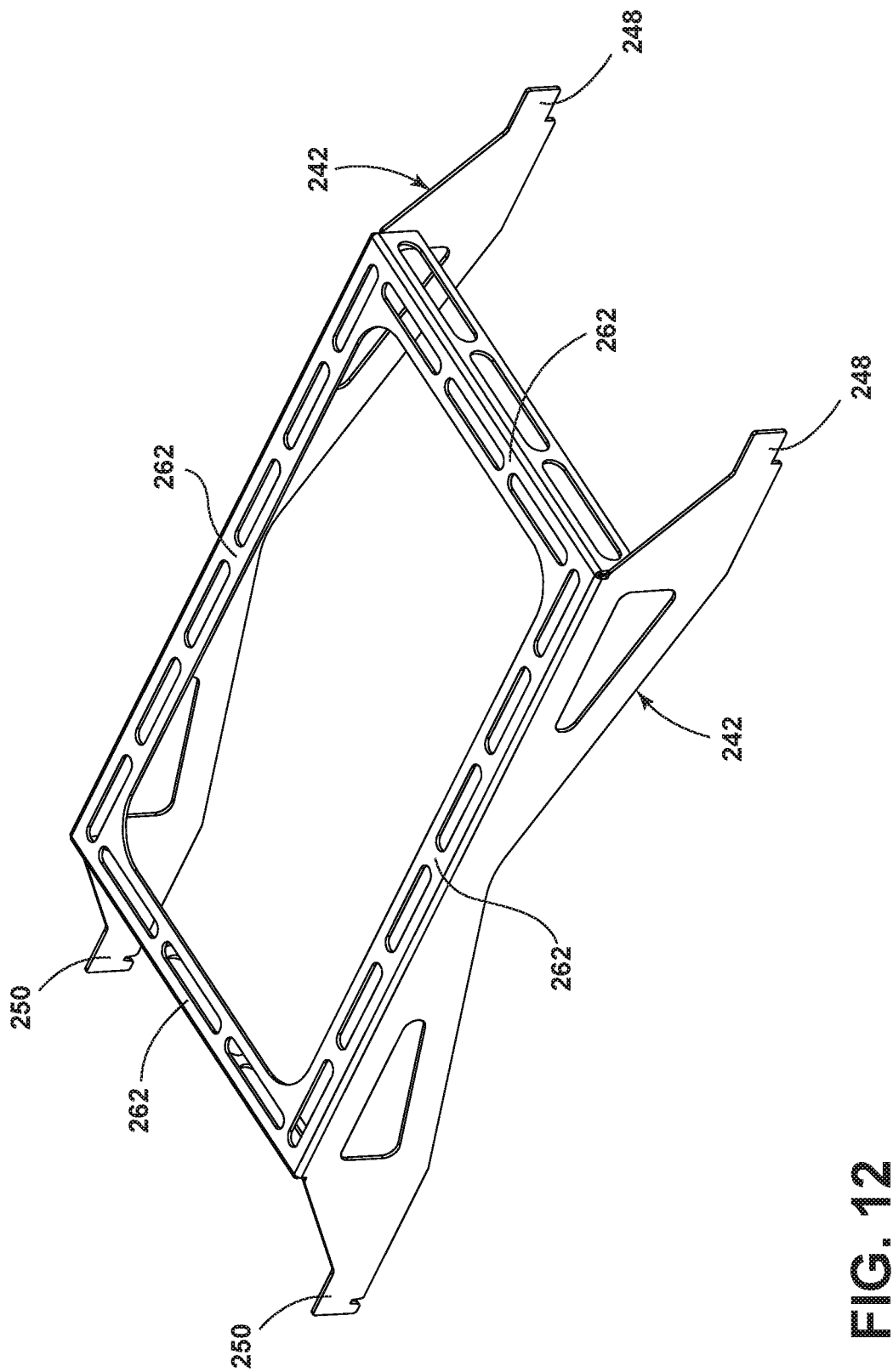
FIG. 12 is a perspective view of an alternate bracket for use with the shelf module.

Referring to FIG. 12, the shelf module may include alternate support brackets 242 for supporting the shelf. The support brackets 242 are similar to the support brackets of the previous embodiments. The support brackets 242 each include a support tab 248 on one distal end and a hook 250 on the opposite distal end. Supports 262 are included between the support brackets 242 to provide lateral stability and along a portion of the length of the brackets 242.

Utilizing the split support brackets 142, 242 and half shelves 152 enables further customization of the display surface and display positions. The shelf modules 140 increase the number of display position combinations available with the counter 100. Additionally, the half shelf 152 may be substantially the same perimeter size as a traditional half hotel pan to conveniently and easily display a half hotel pan thereupon.

The food well displays 10, 100 can be used with the customer's own existing countertop and/or cabinet. Further, the base cabinet 16 of any of the above described embodiments may include standard refrigeration and/or heating equipment. Optionally, the flexible food well cabinet may be configured to work with a customer's own existing base cabinet.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A food well display configured for use with a cabinet including a countertop defining an opening, the food well display comprising:
   an upwardly open food well having opposed vertical walls and configured to be housed within the cabinet, the food well aligned with the opening of the countertop to provide access into the food well; and
   a plurality of shelf modules capable of being mounted to the vertical walls of the food well each at a selectable height,
   wherein each shelf module comprises two spaced support brackets and a shelf supported by the support brackets, the shelf having a substantially planar upper surface configured to support food items and/or containers thereupon.

2. The food well display of claim 1 wherein each of the plurality of shelf modules is selectively and independently moveable between at least a first display position when the shelf is substantially flush with the countertop and a second display position when the shelf is recessed below the countertop.

3. The food well display of claim 2 wherein the shelf modules are further configured to be mounted at an angle such that the shelf and display position are angled relative to the countertop.

4. The food well display of claim 1, the food well including a bottom surface, the vertical walls are front and rear walls, and opposed end walls.

5. The food well display of claim 4, the front and rear walls of the food well include columns of slots configured to receive the support brackets.

6. The food well display of claim 5 wherein each support bracket includes legs at one end thereof and hooks at the other end thereof, the legs and hooks are configured to be received in the slots in the front and rear walls of the food well.

7. A food well display comprising:
- an upwardly opening food well having opposed vertical walls and configured to be housed within a cabinet including a countertop defining an opening through which the food well may be accessed;
- a plurality of shelves; and
- a plurality of brackets, each of the brackets removably and individually mounted in spaced pairs to the vertical walls of the food well at a selectable height, one of the plurality of shelves supported by one of the pairs of the plurality of brackets, each of the plurality of shelves having a substantially planar upper support surface configured to support food items and/or containers thereupon,
- wherein each of the plurality of shelves is configured to be mounted at a selectable height within the food well.

8. The food well display of claim 7, two or more of the plurality of brackets and at least one of the plurality of shelves defining a shelf module, the food well display comprising a plurality of shelf modules.

9. The food well display of claim 8 the vertical walls are front and rear walls wherein a first shelf module is mounted to the front wall of the food well and a second shelf module is mounted to the rear wall of the food well, and aligned first and second shelf modules span the width of the food well.

10. The food well display of claim 9 wherein the shelf modules are independently height adjustable.

11. The food well display of claim 10 wherein each shelf module is adjustable between at least a first display position when the shelf is substantially flush with the countertop and a second display position when the shelf is recessed below the countertop.

12. The food well display of claim 8, the cabinet including refrigeration and/or heating system, and an interior of the food well is heated or cooled by the refrigeration or heating system, and the shelves are insulated.

13. The food well display of claim 7, the food well comprising a removable bottom surface drip pan.

14. The food well display of claim 12, the vertical walls are front and rear walls, the food well comprising a spill funnel disposed along each of the front and rear walls of the food well, the spill funnels configured to direct spills from the shelf onto the drip pan below.

15. A food well display comprising:
- a cabinet;
- a countertop defining an opening;
- an upwardly open food well recessed below the opening of the countertop and disposed within the cabinet, the food well including a front wall and a rear wall;
- a pair of height adjustable and spaced support brackets mounted to the front and rear walls of the food well; and
- a shelf supported atop the pair of support brackets and having a substantially planar upper surface traversing the pair of support brackets, the shelf configured to support food items and/or containers thereupon,
- wherein the support brackets and the shelf define a shelf module, the food well display comprising two or more shelf modules, each shelf module is mountable at a plurality of heights such that the associated shelf is selectively disposed in one of a plurality of display positions.

16. The food well display of claim 15 wherein each shelf module is selectively movable between at least a first display position when the shelf is substantially flush with the countertop and a second display position when the shelf is recessed below the countertop.

17. The food well display of claim 16 wherein the shelf module is further configured to be mounted at an angle such that the display position is angled and the shelf is angled relative to the countertop.

18. The food well display of claim 15 wherein the shelf comprises two half shelves.

* * * * *